UNITED STATES PATENT OFFICE 2,678,328

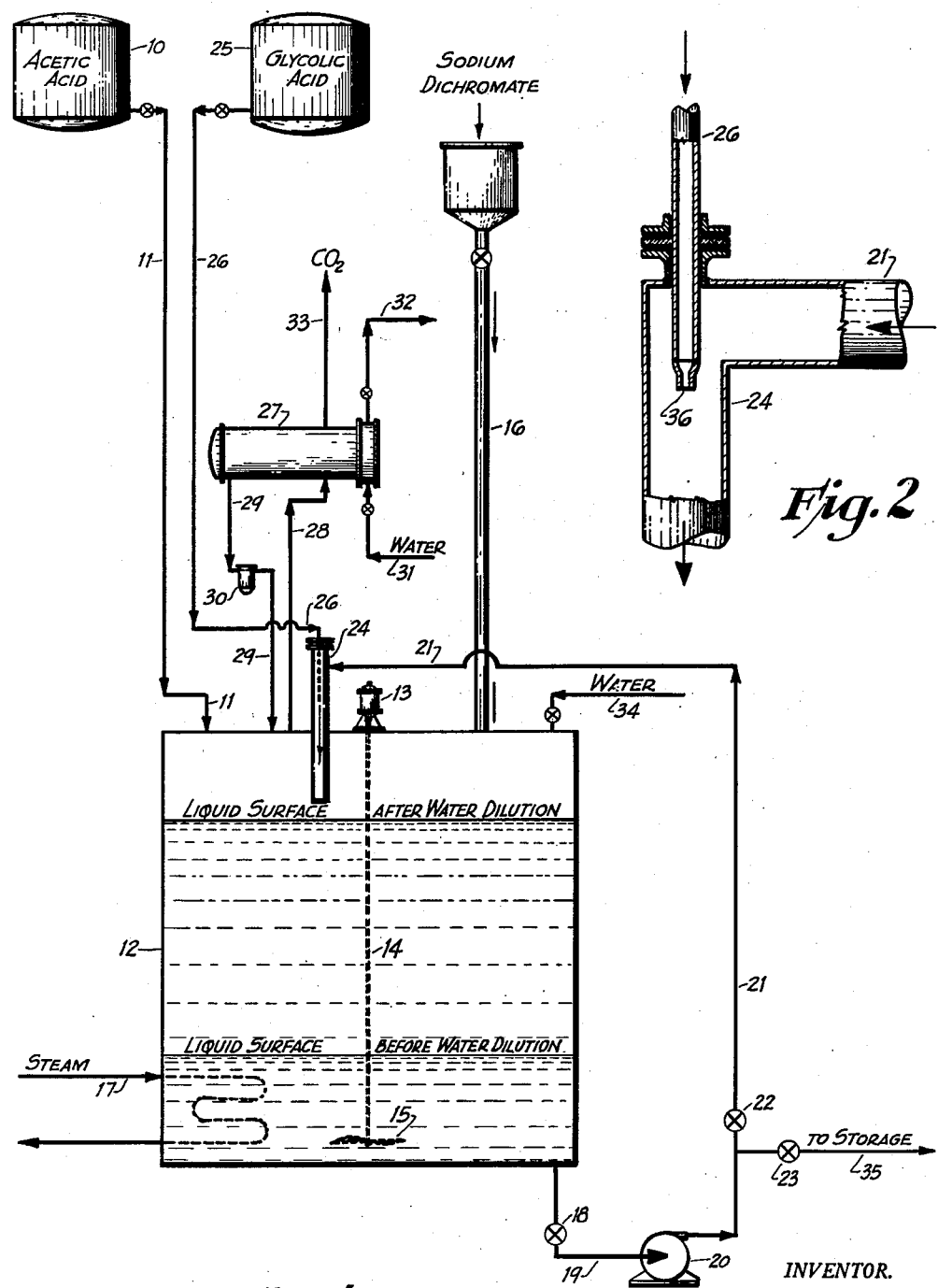

PREPARATION OF CHROMIC SALTS

Robert D. Drew, Wenonah, N. J., assignor to Socony-Vacuum Oil Company, Incorporated, a corporation of New York Application July 25, 1952, Serial No. 300,990

5 Claims. (Cl. 260—438)

This invention relates to an improved process for preparing chromic salts of low molecular weight fatty acids and, more particularly, is concerned with a method for the production of chromic acetate.

Such salts have heretofore been prepared by dissolving chromic hydroxide in the fatty acid whose salt it is desired to produce. Thus chromic acetate has been obtained by dissolving chromic hydroxide in acetic acid. This method has the disadvantage of necessitating preliminary preparation of chromic hydroxide involving precipitation of a solution of a chromic salt with caustic potash, soda or ammonia and subsequent filtration and washing of the resulting precipitate. Such method is not at all attractive from a commercial standpoint. Other processes for preparing chromic acetate have included reduction of dichromates by reaction with various materials such as formaldehyde, sulfur dioxide, ethyl alcohol, and oxalic acid. Each of these processes, however, has certain inherent disadvantages. Thus, the use of formaldehyde in effecting reduction of dichromate in the presence of acetic acid is complicated by the formation of chromic-acetate formate. Reduction of dichromate with $SO_2$, followed by precipitation of the chromia so obtained and subsequent digestion in acetic acid, entails the need for a rather extensive filtration and washing equipment and, therefore, has the disadvantage of being a slow time-consuming process. The use of ethyl alcohol as a reducing medium for dichromates in the presence of acetic acid has resulted in the formation of polymer impurities in the resulting chromic acetate. In the case of oxalic acid, enough oxalic acid must be present to satisfy the chromium oxalate complex in addition to the amount necessary for reduction. Such procedure is not only wasteful of oxalic acid but consumes some of the chromium present in solution which otherwise would be available for conversion to the desired chromic acetate.

In copending application of William A. Stover, Serial No. 174,594, filed July 18, 1950, now Patent No. 2,615,031, there is described and claimed a process for preparing a chromic salt of a low molecular weight fatty acid, such as chromic acetate, by reducing a hexavalent chromium compound with glycolic acid in the presence of a low molecular weight fatty acid. In carrying out the reaction of glycolic acid with a mixture of chromium compound and fatty acid to produce the desired chromic fatty acid salt, it has been found that the reaction is both violent and exothermic, being accompanied by an excessive amount of foam formation due to the evolution of carbon dioxide during the course of reaction. The reactants are necessarily thoroughly admixed, usually by agitation during the reaction and such agitation serves to further increase the violence of the reaction and the production of undesired foam even when the glycolic acid is slowly introduced to an agitated mixture of the chromium compound and fatty acid.

In accordance with the present invention, it has been discovered that the efficiency of reduction of hexavalent chromium to trivalent chromium using a reducing agent of glycolic acid in the presence of a low molecular weight fatty acid is improved and a smoother reaction, accompanied by less foam formation, is obtained by slowly injecting the glycolic acid into a rapidly moving stream of the chromium compound and fatty acid. It has been found particularly desirable to prepare a mixture of the chromium compound and fatty acid in a reaction vessel and to continuously withdraw and recycle a stream of said mixture to the reaction vessel with simultaneous slow injection of the glycolic acid reactant in the stream being recycled.

While the description that follows hereinafter is directed particularly to the preparation of chromic acetate by reaction of glycolic acid, a dichromate and acetic acid, the instant method may likewise be employed with advantage in the production of the chromic salts of other low molecular weight fatty acids, the upper limit of molecular weight being defined of a monobasic fatty acid having not over 6 carbon atoms.

The chromium reactant employed in the instant process is a water-soluble compound containing chromium of valence 6. Representative compounds include chromium trioxide, the water-soluble metal chromates and the water-soluble metal dichromates. The latter group of compounds and, in particular, the alkali metal dichromates, are preferred for use in the present process. Particular preference is accorded sodium dichromate and potassium dichromate.

The procedure of the present invention comprises admixing a chromium compound of the above type with a low molecular weight fatty acid preferably, although not necessarily, in the substantial absence of water, i. e. under conditions such that the initial reaction mixture contains less than about 10 per cent by weight of water. This mixture is slowly heated to a temperature of at least 120° F. at a rate of not more than about 5° F. per minute and preferably 1 to 2° F.

per minute. A stream of the heated mixture is withdrawn and pumped through a pipe at a rapid rate while glycolic acid is slowly injected into the rapidly moving stream of said mixture. The stream containing injected glycolic acid is thereafter recycled to the initial mixture of chromium compound and fatty acid. Preferably, a stream of the heated mixture is continuously withdrawn and recycled at a rapid rate with slow continuous injection of the glycolic acid into the stream being recycled. The rapid recycling and slow injection of glycolic acid to the recycled stream is continued until all of the glycolic acid has been added. The glycolic acid is preferably added to the hot mixture slowly and uniformly over a period generally not exceeding about 8 hours. An addition time of approximately one hour has been found to yield excellent results. The relative rates of flow of the recycled stream and the injected glycolic acid stream are usually between about 5:1 and about 100:1 and, more particularly, between about 8:1 and about 20:1. The glycolic acid is preferably injected into the interior of the rapidly moving chromium compound—fatty acid stream undergoing recycling in order to assure thorough admixture and rapid dissipation of the heat of reaction.

After the addition of glycolic acid is complete, the recycling operation is stopped and the resulting mixture is digested at an elevated temperature. Preferably, the temperature to which the initial mixture of chromium compound and fatty acid is heated should lie within the range of 120–230° F. although, with the use of pressure, higher temperatures may be employed. After addition of glycolic acid, the mixture is suitably digested at a temperature of about 180 to about 230° F. until evolution of carbon dioxide has ceased. The resulting product of chromic acetate may be used in the highly concentrated form in which it is produced or, if desired, the product may be diluted to required concentration depending upon use.

Figure 1 of the attached drawing shows in schematic form apparatus for carrying out the process of the invention.

Figure 2 of the drawing shows in detail a suitable injector for dispersing glycolic acid into the recycled stream.

Referring more particularly to Figure 1, a low molecular weight fatty acid, such as acetic acid, is conducted from storage vessel 10 through conduit 11 to reaction vessel 12. A turbo-agitator 13, provided with shaft 14 and propeller 15, is started and the chromium compound to be used, for example, sodium dichromate, is added through conduit 16 to the agitated acetic acid in vessel 12. After addition of the sodium dichromate, the mixture is slowly heated to the desired temperature by means of steam coils 17. Outlet valve 18 is then opened, permitting a stream of the heated mixture to pass through conduit 19 to pump 20. The mixture is then pumped under pressure through pipe 21, valve 22 being open and valve 23 being closed. The mixture is recycled to injector 24 wherein a small stream of glycolic acid passing from storage vessel 25 through conduit 26 is introduced. The recycled stream containing injected glycolic acid passes into reaction vessel 12 and the recycling operation continues with slow injection of the glycolic acid until all of the latter compound has been added. Valve 18 is then closed and the reaction mixture is digested at reflux temperature until carbon dioxide is no longer evolved from the reaction mixture. Since the reaction is highly exothermic, a reflux condenser 27 is required to condense and return acetic acid vapors passing from the reaction mixture through conduit 28 and the condensed vapors being returned through conduit 29 after passing through a trap 30. The condenser is cooled by water circulated through conduit 31 and withdrawn through conduit 32. After carbon dioxide is no longer evolved through conduit 33, the reaction may be considered as complete and the product may, if desired, be diluted with water introduced into reaction vessel 12 through conduit 34. The chromic acetate reaction product is removed from the reaction vessel through pipe 19, passing through pump 20 and conduit 35, valve 22 being closed and valve 23 being open.

In Figure 2, a suitable injector is shown, the recycled stream passing through conduit 21 and a stream of glycolic acid being injected through conduit 26 into the interior of the recycled stream which passes through the injector 24. As shown, the nozzle of conduit 26 terminates in an orifice 36 of restricted cross-section so that the injected stream of glycolic acid is finely dispersed into the interior of the recycled stream.

Having described in a general way the nature of this invention, it may be more readily understood by reference to the following specific example:

One thousand two hundred and twenty gallons of glacial acetic acid and 8,720 pounds of sodium dichromate are mixed with agitation in a reaction vessel at room temperature (approximately 70° F.). The resulting slurry is heated to 120° F. at a rate of 1–2 F. per minute. The heated slurry of sodium dichromate and acetic acid is withdrawn from the lower portion of the reaction vessel and rapidly recycled to the upper portion of the reaction vessel at a rate of about 200 gallons per minute and a pressure of 30 pounds per square inch gauge. A stream of glycolic acid is slowly injected into the recycled stream at a rate of approximately 7 gallons per minute. The recycling with slow injection of glycolic acid is continued for approximately one hour, at which time 425 gallons of a 70 per cent glycolic acid solution have been added. Recycling is then stopped and the reaction mixture is digested at a temperature of about 230° F. for one hour with agitation until evolution of carbon dioxide ceases. Upon completion of the reaction, the mixture is diluted with water to yield a solution having a specific gravity of 1.207 at 77° F. Typical analysis of the resultant solution is as follows:

| Material | Weight, Percent |
|---|---|
| $Cr^{+6}$ | .001 |
| Total Cr | 6.620 |
| $Cr^{+3}$ | 6.619 |
| Total Acetic Acid | 22.9 |

A small amount of $Cr^{+6}$ in the resulting mixture indicates that substantially complete reduction of sodium dichromate to chromic acetate was accomplished. In addition, the reaction is accompanied by reduced foam formation.

It is preferred to carry out the above-described reaction in the substantial absence of water since the amount of unreduced $Cr^{+6}$ is practically nil when the amount of water in the reaction mixture is less than about 10 per cent. It is also preferred to have an acetate/$Cr^{+3}$ ratio of at least about 2.5 in the reaction mixture. With the use of such a ratio, reduction of dichromate with glycolic acid in the presence of acetic acid under reflux is substantially complete. Thus, it is preferred to employ a slurry of sodium dichromate in glacial acetic acid containing 5.2–6.0 mols acetic acid per mol of sodium dichromate in the initial reaction mixture. Different ratios of glycolic acid to dichromate may be used to accomplish reduction of the dichromate but it has been found that the most efficient reduction is obtained when about 1.4 mols of glycolic acid are reacted with 1 mol of dichromate in the presence of acetic acid.

The process of the present invention, wherein a stream of glycolic acid is slowly injected into a rapidly moving stream of a water-soluble hexavalent chromium compound and a low molecular weight fatty acid, provides an efficient method for preparing the chromic salts of low molecular weight fatty acids. In the presence of a low molecular weight fatty acid, such as acetic acid, the glycolic acid reduction is superior to that obtained with other organic acids such as oxalic, tartaric and citric in that a relatively small excess of glycolic acid is required for complete reduction. In the case of oxalic acid, enough oxalic acid must be employed to satisfy the chromium-oxalate complex in addition to the amount necessary for reduction.

It is to be understood that the above description is merely illustrative of preferred embodiments of the invention, of which many variations may be made within the scope of the following claims by those skilled in the art without departing from the spirit thereof.

I claim:

1. A process for preparing a chromic salt of a low molecular weight fatty acid, which comprises mixing a water-soluble hexavalent chromium compound with a monobasic fatty acid having not more than 6 carbon atoms, heating the resulting mixture to a temperature of at least 120° F., withdrawing a stream of said heated mixture from the body thereof and recycling said stream to said body while slowly injecting glycolic acid into the stream being recycled, the relative rate of flow of said recycled stream being substantially greater than the rate of flow of injected glycolic acid, continuing said recycling with injection of glycolic acid, as aforesaid, until the addition of the latter has been completed and thereafter digesting the resultant mixture at an elevated temperature until evolution of carbon dioxide therefrom has ceased.

2. A process for preparing a chromic salt of a low molecular weight fatty acid, which comprises mixing, in the substantial absence of water, a metal dichromate with a monobasic fatty acid having not more than 6 carbon atoms, heating the resulting mixture to a temperature of at least 120° F., withdrawing a stream of said heated mixture from the body thereof and recycling said stream to said body while slowly injecting glycolic acid into the stream being recycled, the relative rate of flow of said recycled stream being substantially greater than the rate of flow of the injected glycolic acid, continuing said recycling with the injection of glycolic acid, as aforesaid, until addition of the latter has been completed and thereafter digesting the resultant mixture at reflux temperature until evolution of carbon dioxide therefrom has ceased.

3. A process for preparing chromic acetate, which comprises mixing a metal dichromate with acetic acid, heating the resulting mixture to a temperature of at least 120° F., withdrawing a stream of said heated mixture from the body thereof and recycling said stream to said body while slowly injecting glycolic acid into the stream being recycled, the relative rate of flow of said recycled stream being substantially greater than the rate of flow of injected glycolic acid, continuing said recycling with injection of glycolic acid, as aforesaid, until the addition of the latter has been completed and thereafter digesting the resultant mixture at an elevated temperature until evolution of carbon dioxide therefrom has ceased.

4. A process for preparing chromic acetate, which comprises mixing an alkali metal dichromate with glacial acetic acid, slowly heating the resulting mixture at a rate not greater than about 5° F. per minute to a temperature in the range of 120–230° F., withdrawing a stream of said heated mixture from the body thereof and recycling said stream to said body while slowly injecting glycolic acid into the stream being recycled, the relative rate of flow of said recycled stream being substantially greater than the rate of flow of the injected glycolic acid, continuing said recycling with injection of glycolic acid until addition of the latter has been completed, thereafter digesting the resultant mixture at an elevated temperature until evolution of carbon dioxide therefrom has ceased.

5. A process for preparing chromic acetate, which comprises mixing an alkali metal dichromate with acetic acid, heating the resulting mixture to a temperature of at least 120° F., withdrawing a stream of said heated mixture from the body thereof and recycling said stream to said body while slowly injecting glycolic acid into the stream being recycled, the relative rates of flow of said recycled stream and the injected glycolic acid being between about 8:1 and about 20:1, continuing said recycling with injection of the glycolic acid, as aforesaid, until approximately 1.4 mols of glycolic acid per mol of alkali metal dichromate has been added and thereafter digesting the resultant mixture at reflux temperature until evolution of carbon dioxide therefrom has ceased.

References Cited in the file of this patent

UNITED STATES PATENTS

| Number | Name | Date |
| --- | --- | --- |
| 2,615,031 | Stover | Oct. 21, 1952 |